United States Patent [19]

Takaya et al.

[11] Patent Number: 5,332,766
[45] Date of Patent: Jul. 26, 1994

[54] WATER-DISPERSIBLE RESIN COMPOSITION, WATER-DISPERSIBLE COATING COMPOSITION AND COATING METHOD USING THE COATING COMPOSITION

[75] Inventors: Yasuo Takaya, Kanagawa; Masaru Mitsuji, Zama; Mitsugu Endo, Kanagawa, all of Japan

[73] Assignee: Kansai Paint Co., Ltd., Amagasaki, Japan

[21] Appl. No.: 24,083

[22] Filed: Mar. 1, 1993

Related U.S. Application Data

[60] Division of Ser. No. 641,632, Jan. 17, 1991, Pat. No. 5,288,771, which is a continuation of Ser. No. 365,862, Jun. 14, 1989, abandoned.

[30] Foreign Application Priority Data

Jun. 15, 1988 [JP] Japan ................... 63-147304
Sep. 30, 1988 [JP] Japan ................... 63-248474

[51] Int. Cl.$^5$ ............... C08L 83/00; C08F 265/04; C08G 77/00
[52] U.S. Cl. ............... 523/201; 524/510; 524/547; 525/66; 525/68; 525/288; 525/307; 525/902; 526/279
[58] Field of Search ............... 523/201; 524/510, 547; 525/66, 68, 288, 307, 902; 526/279

[56] References Cited

U.S. PATENT DOCUMENTS 4,034,013 7/1977 Lane ................... 523/201
4,791,151 12/1988 Kowalski et al. ................... 523/201
4,980,409 12/1990 Harakawa et al. ................... 524/510

FOREIGN PATENT DOCUMENTS 2169831 7/1987 Japan ................... 525/288

*Primary Examiner*—Paul R. Michl
*Assistant Examiner*—Andrew E. C. Merriam
*Attorney, Agent, or Firm*—Armstrong, Westerman, Hattori, McLeland & Naughton

[57] ABSTRACT

Disclosed are (1) a water-dispersible resin composition prepared by a process comprising; (I) reacting a silane monomer (A) having hydrolytic functional group and/or silano group and polymerizable unsaturated bond with a vinyl monomer (B) in an aqueous medium to obtain a three-dimensionally crosslinked particulate polymer, (II) reacting the particulate polymer with the silane monomer (A) and/or an allyl acrylate or allyl methacrylate (C), and (III) copolymerizing the resulting reaction product with a vinyl monomer component comprising a carboxyl-containing vinyl monomer (D), followed by neutralizing the carboxyl group; (2) a water-dispersible coating composition comprising a crosslinking agent and the water-dispersible resin composition prepared using a hydroxyl-containing vinyl monomer and another vinyl monomer as the vinyl monomer (B) in the step (I), and (3) a coating method characterized by using as a base coat composition a water-dispersible coating composition comprising the foregoing water-dispersible coating composition and a coloring pigment and/or metallic pigment in the two-coat method.

6 Claims, No Drawings

WATER-DISPERSIBLE RESIN COMPOSITION, WATER-DISPERSIBLE COATING COMPOSITION AND COATING METHOD USING THE COATING COMPOSITION

This is a division, of application Ser. No. 07/641,632 filed Jan. 17, 1991 now U.S. Pat. No. 5,288,771, which is a continuation of Ser. No. 07/365,862 filed Jun. 14, 1989 now abandoned.

The present invention relates to a novel water-dispersible resin composition, a novel water-dispersible coating composition and a coating method using the coating composition.

In recent years aqueous coating compositions have been increasingly used in the coating industry to substitute water for a partial or whole quantity of organic solvent serving as a dissolving or dispersing medium from viewpoints of savings of resources and prevention of pollutions.

However, aqueous coating compositions have the problem that the composition applied under high-humidity circumstances (e.g., a humidity of 80% or higher) is caused to flow before drying, giving an uneven surface (namely sagging).

Body panels of motor vehicles, two-wheel vehicles, electric products, etc. which must have a beautiful appearance have been frequently coated by the so-called two-coat one-bake method or two-coat two-bake method (hereinafter both referred to as "two-coat method") to form a coating excellent in surface smoothness, distinctness-of-image gloss, weatherability and the like. The two-coat method comprises coating a substrate such as a body panel with an organic solvent-diluted thermosetting base coat composition containing a coloring pigment and/or metallic pigment and applying an organic solvent-diluted thermosetting clear coating composition to the air-dried or heat-cured coating, followed by heat-curing the two coatings or the clear coating. Investigations are under way on use of aqueous coating compositions in the two-coat method in place of base coat compositions containing a large amount of organic solvent. Yet the use of aqueous coating compositions poses the foregoing serious problem.

It is known to prevent the sagging of applied aqueous coating composition by using a sagging inhibitor capable of increasing the viscosity of coating composition and producing an preventive effect to an extent attainable by a protective colloid. The sagging inhibitor used, however, is unable to achieve a satisfactory effect.

An aqueous emulsion has been proposed for use in the two-coat one-bake method (U.S. Pat. No. 4,403,003). The proposed emulsion contains crosslinked polymer particles dispersed in water and each covered for protection with a polymer, i.e. the so-called steric stabilizer, having a hydrophilic portion and a lipophilic portion, and can be prepared, for example, by subjecting to dispersion polymerization a polymerizable monomer(s) in the presence of the steric stabilizer in an aqueous medium. The emulsion is rendered thixotropic by the increase in the water-solubility of hydrophilic portion due to neutralization of functional group (e.g. carboxyl group) in the hydrophilic portion of steric stabilizer. The proposed emulsion is intended to prevent sagging by utilizing this phenomenon. The emulsion can prevent sagging more effectively than the sagging inhibitor, but can not sustain the effect for a prolonged period time. For example, when great shear force is exerted by agitation or transport through pipes, the emulsion is imparted reduced viscosity, lower thixotropy and increased fluidity, consequently providing a coating of lower sagging resistance. Moreover, the emulsion remains to be improved in the sagging resistance under high-humidity circumstances. The emulsion has the further problem set forth below. The emulsion is brought into contact with an organic solvent when mixed therewith or applied as a base coat material followed by application of organic solvent-diluted clear coating composition in the two-coat one-bake method. On contact therewith, the emulsion or the coating film becomes swollen, tending to deteriorate the smoothness of coating surface.

An object of the present invention is to provide a novel water-dispersible resin composition suitable for use as an aqueous coating composition and free of the foregoing conventional problems.

Another object of the invention is to provide a novel water-dispersible coating composition capable giving a coating which would cause no or little likelihood of sagging or metallic mottling if subjected to great shear force or applied under high-humidity circumstances, and a coating method using the coating composition.

These and other objects of the present invention will become apparent from the following description.

According to the present invention, there is provided a water-dispersible resin composition prepared by a process comprising the following steps (I) to (III); (I) reacting a silane monomer (A) having hydrolytic functional group and/or silanol group and polymerizable unsaturated bond with a vinyl monomer (B) in an aqueous medium to obtain a three-dimensionally crosslinked particulate polymer, (II) reacting the particulate polymer with the silane monomer (A) and/or an allyl acrylate or allyl methacrylate (C), and (III) copolymerizing the resulting reaction product with a vinyl monomer component comprising a carboxyl-containing vinyl monomer (D), following by neutralizing the carboxyl group.

According to the invention, there are further provided a water-dispersible coating composition comprising a crosslinking agent and the water-dispersible resin composition prepared using a hydroxyl-containing vinyl monomer and another vinyl monomer as the vinyl monomer (B), and a coating method characterized by using as a base coat composition a water-dispersible coating composition comprising the foregoing water-dispersible coating composition and a coloring pigment and/or metallic pigment in practicing the two-coat one-bake method or the two-coat two-bake method.

In view of the foregoing prior art problems, we conducted extensive research and found that the objects of the present invention can be fulfilled by using (i) a water-dispersible resin composition prepared by chemically uniting a crosslinked particulate polymer in an emulsion with a polymer for stablizing the crosslinked particulate polymer by specific means, (ii) an aqueous coating composition comprising a crosslinking agent and the resin composition with the particulate polymer having hydroxyl group and (iii) a coating method using the aqueous coating composition as a base coat composition in the two-coat method.

The present invention has been accomplished on the basis of this novel finding.

The water-dispersible resin composition of the invention (hereinafter referred to as "present composition") is an emulsion containing core/shell-type polymer particles each composed of crosslinked particulate polymer as a core and a stabilizer polymer as a shell.

The present composition can be prepared by executing the following steps (I), (II) and (III).

(1) Step (I)

A silane monomer (A) having hydrolytic functional group and/or silano group and polymerizable unsaturated bond (hereinafter referred to as "silane monomer (A)") is reacted with a vinyl monomer (B) in an aqueous medium, giving an emulsion comprising a three-dimensionally crosslinked particulate polymer dispersed in water. The particulate polymer constitutes the core.

(2) Step (II)

The particulate polymer in the emulsion is reacted with the silane monomer (A) and/or an ally acrylate or allyl methacrylate (C). In this step, presumably the silane monomer undergoes condensation reaction with the functional group present on the surface of the particulate polymer, while the allyl acrylate or ally methacrylate is copolymerized with the unreacted polymerizable unsaturated bond remaining in the particulate polymer. In any case, the reactions result in introduction of polymerizable unsaturated bond onto the surface of particulate polymer.

(3) Step (III)

In the emulsion formed by the reactions in the step (II), a vinyl monomer component comprising a carboxyl-containing vinyl monomer (D) is copolymerized with the particulate polymer obtained in the step (II), followed by neutralizing the carboxyl group. The neutralized copolymer is one capable of stabilizing the dispersion of particulate polymer and constituting the shell. In the step (III), the vinyl monomer component is copolymerized with the polymerizable unsaturated bond formed from the silane monomer and/or allyl acrylate or ally methacrylate on the surface of the particulate polymer resulting from the reactions in the step (II).

The steps (I) to (III) for preparing the present composition will be described below in detail.

Step (I)

The silane monomer (A) to be used in the step (I) is a silane compound having hydrolytic functional group and/or silanol group and containing polymerizable unsaturated bond. Preferred silane monomers are compounds represented by the formula $(R_1)_3\text{-Si-X}$ wherein $R_1$ is hydrolytic functional group and/or silanol group and X is a residue having polymerizable double bond and like polymerizable unsaturated bond, namely compounds having per molecule hydrolytic functional group and/or silanol group numbering three in total and one residue having one polymerizable unsaturated bond per molecule, all bonded to Si. The silane monomer to be used is one capable of forming a core when internally crosslinked.

Examples of hydrolytic functional groups represented by $R_1$ in the foregoing formula are alkoxy group having 1 to 12 carbon atoms, alkoxyalkoxy group having 3 to 15 carbon atoms, alkanoyloxy group having 1 to 12 carbon atoms, etc. Examples of residues represented by X are $CH_2\!=\!CH-$,

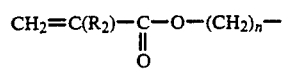

(wherein $R_2$ is hydrogen or $CH_3-$, and n is an integer of 2 to 10), etc.

Examples of the silane monomer (A) for use in the invention are vinyltrimethoxysilane, vinyltriethoxysilane, acryloxyethyltrimethoxysilane, methacryloxyethyltrimethoxysilane, acryloxypropyltrimethoxysilane, methacryloxypropyitrimethoxysilane, acryloxypropyitriethoxysilane, methacryloxypropyitriethoxysilane, vinyltris (β-methoxyethoxy)silane, etc. Among them, preferred silane monomers are vinyltrimethoxysilane, γ-acryloxypropyltrimethoxysilane, γ-methacryloxypropyltrimethoxysilane, etc.

The vinyl monomer (B) to be copolymerized with the silane monomer (A) in an aqueous medium is a compound having at least one polymerizable unsaturated bond per molecule, and does not include the silane monomers. Examples of the vinyl monomer (B) are as follows. (1) Monoesters of acrylic acid or methacrylic acid with monohydric alcohol having 1 to 20 carbon atoms such as methyl acrylate, methyl methacrylate, ethyl acrylate, ethyl methacrylate, propyl acrylate, propyl methacrylate, butyl acrylate, butyl methacrylate, 2-ethylhexylacrylate, 2-ethylhexyl methacrylate, cyclohexyl acrylate, cyclohexyl methacrylate, lauryl acrylate, lauryl methacrylate, etc.

(2) Aromatic vinyl monomers such as styrene, α-methylstyrene, vinyltoluene, etc.

(3) Hydroxyl-containing vinyl monomers: compounds having one hydroxyl group and one polymerizable unsaturated bond per molecule among which preferable are monoesters of acrylic acid or methacrylic acid with dihydric alcohol having 2 to 10 carbon atoms such as 2-hydroxyethyl acrylate, 2-hydroxyethyl methacrylate, hydroxypropyl acrylate, hydroxypropyl methacrylate, etc.

(4) Carboxyl-containing vinyl monomers: compounds having at least one carboxyl group and one polymerizable unsaturated bond per molecule such as acrylic acid, methacrylic acid, crotonic acid, maleic acid, itaconic acid, etc.

(5) Glycidyl-containing vinyl monomers: compounds having one glycidyl group and one polymerizable unsaturated bond per molecule such as glycidyl acrylate, glycidyl methacrylate, etc.

(6) Nitrogen-containing alkyl ($C_{1-20}$) acrylate such as dimethylaminoethyl acrylate, dimethylaminoethyl methacrylate, etc.

(7) Amide compounds containing polymerizable unsaturated bond such as acrylic amide, methacrylic amide, dimethylacrylamide, N,N-dimethylpropylacrylamide, N-butoxymethylacrylamide, etc.

(8) Vinyl compounds such as vinyl acetate, vinyl chloride, etc.

(9) Nitrile compounds containing polymerizable unsaturated bond such as acrylonitrile, methacrylonitrile, etc.

(10) Diene compounds such as butadiene, isoprene, etc.

(11) Polyvinyl compounds having at least two polymerizable unsaturated bonds per molecule such as ethylene glycol diacrylate, ethylene glycol dimethacrylate, triethylene glycol diacrylate, tetraethylene glycol dimethacrylate, 1,6-hexanediol diacrylate, divinylbenzene, trimethylolpropane triacrylate, etc. (Of said examples of polyvinyl compounds, preferable are those containing at least two unsaturated bonds which are not widely different in reactivity from each other).

These vinyl monomers are usable singly or at least two of them can be used in mixture.

Of said examples of vinyl monomers, preferable are the monomers selected from those shown above in (1), (2), (3) and (11).

In the step (I), the particulate polymer is prepared by copolymerizing the silane monomer (A) and the vinyl monomer (B) in an aqueous medium to give a crosslinked particulate polymer as described above. This copolymerization can be done, for example, by the following conventional emulsion polymerization methods. (i) A mixture of monomers (A) and (B) is added dropwise in an atmosphere of inert gas to an aqueous medium being stirred and consisting of water and a surfactant to copolymerize the monomers at a specific temperature. (ii) An emulsion of monomers (A) and (B) dispersed in an aqueous medium is added dropwise to water being stirred to copolymerize the monomers at a specific temperature. (iii) A small quantity of monomer or monomers (singly or in mixture) is subjected to seed polymerization and the resulting polymer is subjected to emulsion polymerization by the method (i) or (ii).

Among the foregoing methods, the method (iii) is suitable because it is capable of reducing the particle size and improving the sagging resistance and surface smoothness.

It is preferred to conduct these emulsion polymerizations in the presence of a radical polymerization initiator.

The monomers are used in the steps (I) and (III) in the following proportions. The total monomers are used in the step (I) in an amount of about 30 to about 95% by weight, preferably about 60 to about 90% by weight, based on the combined weight of monomers for use in the steps (I) and (III). The total monomers are used in the step (III) in an amount of about 70 to about 5% by weight, preferably about 40 to about 10% by weight, based on the combined weight of monomers for use in the steps (I) and (III). Used in the step (I) are the silane monomer (A) and vinyl monomer (B), more specifically about 0.5 to about 20% by weight, preferably about 1 to about 10% by weight, of the silane monomer (A) and about 99.5 to about 80% by weight, preferably about 99 to about 90% by weight, of the vinyl monomer (B), based on the combined weight of monomers (A) and (B). In the step (III), the monomer component includes the carboxyl-containing vinyl monomer (D) in an amount of about 1 to about 50% by weight, preferably about 3 to about 30% by weight, based on the weight of vinyl monomer component. The vinyl monomer component may further contain about 10% by weight or less of a silane monomer and/or polyvinyl compound exemplified above in (11) as the vinyl monomer for use in the step (I).

The surfactant to be used for the emulsion polymerization in the step (I) can be either anionic or nonionic. Examples of useful anionic surfactants are an alkali metal salt or ammonium salt of long-chain alkyl sulfate, long-chain alkyl sulfonate or long-chain alkyl sulfosuccinate; alkali metal salt of alkyl disulfate; alkali metal salt or ammonium salt of polyoxyethylene alkylphenyl ether sulfate; alkali metal salt or ammonium salt of alkyldiphenyl ether disulfonate; alkali metal salt or ammonium salt of dialkyl sulfosuccinate; etc. Examples of useful nonionic surfactants are polyoxyethylene alkylphenyl ether, polyoxyethylene alkyl ether, polyoxyethylene long-chain carboxylate, etc. These surfactants are usable singly or at least two of them can be used in mixture. The amount of the surfactant to be used is about 0.05 to about 10 parts by weight, preferably about 0.1 to about 5 parts by weight, more preferably about 0.5 to about 3 parts by weight, per 100 parts of the total monomers to be used in the step (I).

Suitable examples of the radical polymerization initiator for use in the step (I) include peroxide compounds such as ammonium persulfate, sodium ammonium persulfate, potassium ammonium persulfate, potassium persulfate, sodium pyrosulfite, t-butyl hydroperoxide, cumene hydroperoxide, etc. These radical polymerization initiators are usable singly or at least two of them can be used in mixture. The amount of the polymerization initiator to be used is about 0.1 to about 10 parts by weight, preferably about 0.2 to about 5 parts by weight, per 100 parts of the total monomers for use in the step (I).

In the step (I), the two monomers are copolymerized at a temperature of about 90° C. or lower, preferably about 25° to about 90° C.

It is desirable to carry out the copolymerization in the step (I) using the two monomers in the total concentration of about 10 to about 60% by weight.

The emulsion obtained in the step (I) comprises the particulate polymer formed by three-dimensionally crosslinking the silane monomer (A) and the vinyl monomer (B) and dispersed in an aqueous medium. The crosslinking reaction of two monomers occurs together with the copolymerization of polymerizable unsaturated bonds contained in the two monomers and the condensation reaction of hydrolytic functional group in the silane monomer (A) and/or of silanol group therein, and optionally with the reaction of hydroxyl group which may be present in The vinyl monomer (B) with the silane monomer (A). The reactions presumably give polymer particles composed of three-dimensionally crosslinked bonds, i.e. —C—C— bonds formed from polymerizable unsaturated bonds and —Si—O—Si— bonds formed from the silane monomer (A). Also presumable is that the hydrolytic functional group and/or silanol group derived from the silane monomer (A) is attached as unreacted to the surface of the polymer particles. The particle size of the polymer particles obtained in the step (I) varies according to the kind and amount of surfactant and the like and the polymerization method, but ranges from about 10 to about 500 nm, preferably about 30 to about 300 nm.

Step (II)

The silane monomer (A) and/or an allyl acrylate or allyl methacrylate (C) is reacted with the particulate polymer in the emulsion obtained in the step (I) to introduce the polymerizable unsaturated bond onto the surface of particulate polymer. The particulate polymer produced in the step (II) with the polymerizable unsaturated bond introduced therein is hereinafter referred to as "unsaturated particulate polymer".

The silane monomer (A) is reacted with the unreacted hydrolytic functional group and/or silanol group attached to the surface of the particulate polymer obtained in the step (I) to introduce the polymerizable unsaturated bond onto the surface thereof.

Stated more specifically, the silane monomer (A) is incorporated into the emulsion produced in the step (I), and the resulting emulsion is left to stand at a temperature of, e.g. about 20° to about 90° C., whereby the silane monomer (A) becomes adsorbed onto the surface of the particulate polymer in the emulsion while the foregoing reaction proceeds to introduce the polymerizable unsaturated bond onto the surface thereof.

The ratio of the particulate polymer and the silane monomer (A) to be used in the step (II) is not specifically limited. Yet the silane monomer (A) is used in the step (II) in an amount of preferably about 0.5 to about 2 moles per mole of the silane monomer (A) used in the step (I) (usually about 50 to about 200 parts by weight of the former per 100 parts by weight of the latter). A lesser amount of the former used tends to reduce the amount of polymerizable double bond introduced and to impair the stability of the present composition, whereas a larger amount thereof is apt to cause coagulation of particulate polymer.

The monomer (C) is an allyl acrylate or allyl methacrylate. Of the allyl double bond and the acrylic or methacrylic double bond present in the monomer (C), the acrylic or methacrylic bond is more readily polymerized than the former. When the monomer (C) is incorporated into the aqueous dispersion obtained in the step (I) and the dispersion is heated to about 40° to about 90° C., the acrylic or methacrylic double bond in the monomer (C) is copolymerized with the unreacted monomer contained in the particulate polymer of the aqueous dispersion, whereby the less polymerizable allyl double bond presumably remains in an unreacted state on the surface of the particulate polymer. A preferred amount of the monomer (C) to be used is about 0.5 to about 5 parts by weight per 100 parts by weight of the particulate polymer.

In the event the monomers (A) and (C) are conjointly used, the foregoing reactions occur concurrently.

Conjoint use of monomers (A) and (C) is preferred to accomplish the objects of the invention. The proportions of the particulate polymer and these monomers are as shown above.

Step (III)

The unsaturated particulate polymer obtained in the step (II) is copolymerized with a vinyl monomer component including a carboxyl-containing vinyl monomer (D). Subsequently the carboxyl group is neutralized to form a shell.

The vinyl monomer component comprises a carboxyl-containing vinyl monomer (D) and another vinyl monomer. Suitable examples of the vinyl monomer component include the foregoing examples of the vinyl monomer (B) to be copolymerized with the silane monomer in the step (i). More specifically, usable as the monomer (D) is at least one monomer selected from the examples set out above in (4) as the carboxyl-containing vinyl monomer. Among the examples (4), acrylic acid, methacrylic acid and the like are preferred. The other vinyl monomer of the vinyl monomer component is a compound other than the carboxyl-containing vinyl monomer and having one polymerizable unsaturated bond per molecule. Usable as such monomers are those exemplified above in (1) to (3) and (5) to (10). The polyvinyl compounds shown above in (11) and silane monomer (A) can be conjointly used.

The carboxyl-containing vinyl monomer (D) and the other vinyl monomer for the vinyl monomer component are used in the following proportions. The proportions are about 1 to about 50% by weight, preferably about 3 to about 30% by weight, of the vinyl monomer (D) and about 99 to about 50% by weight, preferably about 97 to about 70% by weight of, the other vinyl monomer, based on the total weight of two monomers. The vinyl monomer component is used in an amount of about 70 to about 5% by weight, preferably about 40 to about 10% by weight, based on the combined weight of the silane monomer (A) and the vinyl monomer (B) used as described above in the step (I) (namely the particulate polymer obtained in the step (I)), and the vinyl monomer component. When a silane monomer and polyvinyl compound are conjointly used in the step (III), a preferred amount of these components is 10 parts by weight or less per 100 parts by weight of the vinyl monomer component.

The copolymerization of the vinyl monomer component and the particulate polymer in the step (III) can be carried out by the emulsion polymerization method (i) or (ii) stated hereinbefore. For this copolymerization, the vinyl monomer component is incorporated into the emulsion of the unsaturated particulate polymer obtained in the step (II) and the mixture is reacted at a temperature of about 50° to about 90° C. It is preferred to conduct this reaction in the presence of the foregoing radical polymerization initiator when so required.

The step (III) is performed to unite chemically the unsaturated particulate polymer (core) obtained in the step (II) with the linear copolymer (shell) composed of the vinyl monomer component.

Stated more specifically, the vinyl monomer component is copolymerized with the bonds attached to the surface of the unsaturated particulate polymer obtained in the step (II), namely the polymerizable unsaturated bond of the silane monomer and/or the polymerizable unsaturated bond remaining in the allyl acrylate or methacrylate copolymerized with the unreacted monomer contained in the particulate polymer, whereby the copolymer of the vinyl monomer component (shell) is chemically united with the surface of particulate polymer (core) obtained in the step (I). When the silane monomer (A) and the polyvinyl compound (11) are conjointly used in the step (III), the linear copolymer is a reticulate one which can be chemically united with the particulate polymer.

In the step (III), the unsaturated particulate polymer is copolymerized with the vinyl monomer component to form a shell after which the carboxyl group of the shell is neutralized. The neutralization is conducted by incorporating a neutralizing agent into the reaction system. Examples of useful neutralizing agents are sodium hydroxide, potassium hydroxide and like inorganic alkali substances, ammonia and amine compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, morpholine, etc.

The neutralization reaction is performed at room temperature or at an elevated temperature, giving the present composition. The particulate polymer eventually obtained in the step (III) comprises the core formed in the step (i) and the shell attached thereto and made hydrophilic by neutralization. The thus obtained particulate polymer has a particle size about 10 to about 100% larger than the particulate polymer obtained in the step (I) as the core.

The present composition thus prepared is an aqueous emulsion of core/shell-type particulate polymer prepared by carrying out the steps (I) to (III). The content of resin solids in the emulsion can be suitably varied but is usually in the range of about 20 to about 50% by weight.

The present composition is suitable for use as a usual coating composition, a coating composition for finishing paper sheets, adhesives, etc. Before use, a coloring pigment, extender pigment, metallic pigment and the like can be incorporated into the present composition.

The present composition is preferably mixed with a conventional aqueous coating composition to make the aqueous composition thixotropic for prevention of sagging. Examples of the conventional aqueous coating compositions to be mixed are water-soluble or water-dispersible coating compositions predominantly containing an acrylic resin, vinyl resin, alkyd resin, polyester resin or the like. In this case, a preferred amount of the present composition included in the aqueous coating composition is about 10 to about 300 parts by weight, calculated as solids, per 100 parts of the resin solids in the aqueous composition.

According to the invention, a water-dispersible coating composition having excellent properties can be obtained by mixing a crosslinking agent with the water-dispersible resin composition of the invention prepared using as the vinyl monomer (B) any of the hydroxyl-containing vinyl monomers exemplified above in (3) and another vinyl monomer.

The water-dispersible coating composition of the invention can be prepared by adding a crosslinking agent to the present composition formed by execution of the steps (I) to (III). For this preparation, it is critical that a three-dimensionally crosslinked particulate polymer be prepared in the step (I) by reacting in an aqueous medium the silane monomer (A), the hydroxyl-containing vinyl monomer (3) and the vinyl monomer (B) other than said monomers. The hydroxyl-containing vinyl monomer (3) is used to introduce, onto the surface of particulate polymer, hydroxyl group acting as functional group reactive with the crosslinking agent.

The vinyl monomer (B) to be copolymerized with the silane monomer (A) and the hydroxyl-containing vinyl monomer (3) in an aqueous medium is a compound having at least one polymerizable unsaturated bond per molecule and include the compounds indicated above in (1), (2) and (4) to (11) and other than the silane monomer (A) and the hydroxyl-containing vinyl monomer (3). The vinyl monomer (B) is used to improve the water resistance, adhesion between layers, stability of aqueous dispersion, etc.

The monomers for use in the step (I) are the silane monomer (A), hydroxyl-containing vinyl monomer (3) and other vinyl monomer (B) which are used in the following proportions. The proportions are about 0.5 to about 20% by weight, preferably about 1 to about 10% by weight, of the silane monomer (A), about 1 to about 30% by weight, preferably about 2 to about 20% by weight, of the hydroxyl-containing vinyl monomer (3), about 98.5 to about 50% by weight, preferably about 97 to about 70% by weight, of the vinyl monomer (B), based on the combined weight of total monomers.

The hydroxyl-containing vinyl monomer (3) may be used in addition to the carboxyl-containing vinyl monomer (D) for the vinyl monomer component in the step (III) in preparation of the present water-dispersible coating composition. The amount of the vinyl monomer (3) to be used is about 30% by weight or less, preferably about 25% by weight or less, based on the weight of the vinyl monomer component. The compounds exemplified above as the monomer (B) (other than the monomers (3), (4) and (11)) are usable in addition to the vinyl monomer (D), or alternatively the vinyl monomer (D) and the vinyl monomer (3) for the vinyl monomer component in the step (III). The amount of such compound for use is about 99 to about 10 20% by weight, preferably about 97 to about 45% by weight, based on the weight of the vinyl monomer component.

The vinyl monomer component to be used in the step (III) as stated above may include the silane monomer (A) and/or any of polyvinyl compounds shown above in (11) as the vinyl monomer (B) each in a ratio of about 10% by weight or less, based on the weight of the vinyl monomer component.

The crosslinking agent present in the water-dispersible coating composition is one capable of dissolving or dispersing uniformly in the present composition and crosslinkable when heated with the hydroxyl group of the particulate polymer eventually obtained in the step (III) to form a cured coating film.

Examples of useful crosslinking agents are melamine resin, benzoguanamine resin, urea resin and like amino resins as methylolated, these resins as etherified with alkyl, phenolformaldehyde resin, block polyisocyanate compounds, etc. While a water-soluble or hydrophobic crosslinking agent is usable, a hydrophobic one is preferably used to improve the amenability to coating operation, storage stability, humidity resistance and the like.

For example, suitable hydrophobic melamine resins are those having a solvent dilution ratio of about 20 to about 0.1, preferably about 18 to about 0.1 and a weight-average molecular weight of about 700 to about 4,000, preferably about 800 to about 3,000. The solvent dilution ratio used in the invention is an index indicating the solubility of melamine resin in hydrophilic solvents. The lower the ratio, the more hydrophobic is the resin. The solvent dilution ratio is determined by the following method. Two grams of melamine resin is placed into a 50-cc beaker, which is then placed on paper bearing a print of No.5 type. Subsequently, at 25° C. a mixture of water and methanol (35/65 in weight ratio) is added dropwise to the resin with stirring until the print becomes illegible. The amount (cc) thus added is divided by the amount of the melamine resin to obtain a value (cc/g) as the ratio.

The hydrophobic melamine resin is not limited specifically insofar as it fulfills the solvent dilution ratio and molecular weight requirements. The resin ms usable as etherified variously, for example, as modified with at least one of methyl alcohol, ethyl alcohol, isopropyl alcohol, n-butyl alcohol, isobutyl alcohol, octyl alcohol, 2-ethylhexyl alcohol, benzyl alcohol, etc. According to the invention, it is suitable to use the resin as modified with an alcohol having at least four carbon atoms, more preferably four to seven carbon atoms. The amount of ether groups in the melamine resin, although not limited specifically, is suitably about 5 moles or less, preferably about 1.5 to about 3 moles, per triazine ring. Further as to the functional groups such as amino, imino and methylol, the kind and amount remaining functional groups are not limited specifically provided that the foregoing solvent dilution ratio and molecular weight requirements are satisfied. Usually, however, the amount of imino groups (inclusive of amino groups), as well as of methylol groups, is about 0.2 to about 2.0 moles, preferably about 0.5 to about 1.5 moles, per triazine ring.

The hydrophobic crosslinking agent is preferably mixed with a water-soluble resin before blending with the present composition so that the surface of hydrophobic crosslinking agent (usually in a particulate form) is coated with the resin to improve the amenability to coating operation (prevention of sagging, etc.), storage stability and the like.

Water-soluble resins useful for this purpose are those having introduced therein a quantity of hydrophilic groups, such as carboxyl (—COOH), hydroxyl (—OH), methylol (—CH$_2$OH), amino (—NH$_2$), sulfo (—SO$_3$H) or polyoxyethylene bond

Examples of such resins are acrylic resin, alkyd resin, epoxy resin and the like. The most typical of such water-soluble resins are those having carboxyl groups introduced therein, neutralized to an alkali salt and thereby made soluble in water.

Suitable proportions of the hydrophobic crosslinking agent and water-soluble resin are about 20 to about 100 parts by weight, preferably about 28 to about 80 parts by weight, of the latter per 100 parts by weight or the former calculated as solids. The two components can be mixed by any suitable method, for example by mixing together the two components using a stirrer, homomixer or the like to provide a homogeneous blend. When required, small amount of hydrophilic solvent, such as alcohol solvent or ether solvent, can be added to the mixture in this step. Next, deionized water is added in small portions to the mixture in about 0.5 to about 5 times the combined amount by weight of the two components while vigorously stirring the mixture, whereby the crosslinking agent is made into a milky white one or colored aqueous dispersion. The dispersion contains particles about 0.05 to about 0.5 μm in mean particle size.

The amount of the crosslinking agent to be used is about 10 to about 50% by weight, preferably about 15 to about 40% by weight, based on the total weight of the agent and the resin solids in the present composition (in the event another resin or aqueous coating composition is used along with the present composition, the resin solids contained therein are added).

The water-dispersible coating composition of the invention may contain a metallic pigment and/or coloring pigment. Examples of useful metallic pigments are aluminum flake, copper bronze flake, micaceous iron oxide, mica flake, metallic oxide-coated macaceous iron oxide, metallic oxide-coated mica flake, etc. Examples of useful coloring pigments are titanium dioxide, iron oxide, chromium oxide, lead chromate, carbon black and like inorganic pigments, Phthalocyanine Blue, Phthalocyanine Green, Carbazole Violet, Anthrapyrimidine Yellow, Flavanthrone Yellow, Isoindoline Yellow, Indanthrone Blue, Quinacridone Violet and like organic pigments. Dyes are also usable as the coloring pigment.

To facilitate the formation of coating, the water-dispersible coating composition of the invention preferably contains a water-soluble or water-dispersible resin predominantly containing acrylic resin, vinyl resin, alkyd resin, polyurethane resin, polyester resin or the like. The amount of such resin to be used is about 20 to about 1,000 parts by weight per 100 parts by weight of the resin solids in the present composition. When required, the present composition may further contain a defoaming agent, thickener, fungicide and the like.

The coating composition of the invention is suitable for use as a usual top coat composition, a coating composition for finishing paper sheets and other purposes.

The coating formed from the water-dispersible coating composition of the invention can be cured by heating usually at a temperature of about 120° to about 180° C.

The coating method of the present invention will be described below.

The coating method of the invention is characterized in that a water-dispersible coating composition comprising the coating composition of the invention and a coloring pigment and/or metallic pigment is used as a base coat composition in the two-coat method.

The water-dispersible coating composition for use as a base coat composition is prepared by dispersing the coloring pigment and/or metallic pigment in the coating composition of the invention.

The conventional clear coating composition to be used in the coating method of the invention can be any of clear coating compositions commonly used in the two-coat method. Stated more specifically, useful clear coating compositions are those comprising a base resin and a crosslinking agent as essential components and an organic solvent for dissolving or dispersing the components, and capable of forming a transparent coating film. Examples of useful base resins are alkyd resin, acrylic resin, polyester resin, silicone polyester resin, urethane resin, etc. which are required to have functional group crosslinkable with a crosslinking agent. Examples of useful crosslinking agents are melamine resin, benzoguanamine resin, urea resin and like amino resins as methylolated, these resins as etherified with lower alkyl, aliphatic dibasic acid, polyisocyanate compounds, block polyisocyanate compounds, etc.

The clear coating composition for use herein may contain a coloring pigment and/or metallic pigment insofar as the pigment does not impair transparency.

Useful clear coating compositions may be of a solution type, dispersion type, nonaqueous dispersion type or highly solid type. A powder-type composition is also usable.

Substrates suitable for the coating method of the invention include outer panels of automobiles, buses, trucks, motorcycles and the like. Also usable are outer plates of electric appliances and like substrates which must have a beautiful finishing appearance. These substrates may be those coated with a primer or an intercoat composition.

In use as a base coat composition in the two-coat one-bake method, the coating composition of the invention is preferably adjusted to a solids content of about 10 to about 40% by weight and to a viscosity of about 500 to about 4,000 cps/6 rpm (B-type viscometer) by adding deionized water and, when required, additives such as a thickener and defoaming agent as in a usual process. The base coat composition is applied to a substrate as by spray coating or the like to form a coating of about 10 to about 50 μm in dry thickness and then dried in air or hot air until the volatile content of the coating reduces to about 25% by weight or lower, preferably about 15% by weight or lower. A clear coating composition with a viscosity adjusted to about 10 to about 30 sec (Ford cup #4°/20° C.) is then applied as by electrostatic spray coating or the like to the resulting coating to a dry thickness of about 15 to about 70 μm, preferably about 25 to about 40 μm. Subsequently, the coated substrate is set in a usual manner and then heated to about 120° to about 180° C. to cure the coatings. In application, the coating composition of the invention is highly amenable to the coating operation, readily forming a beautiful coating.

In case of the two-coat two-bake coating system, the coating method of the invention is carried out in the same manner as above except that the base coating is heated at the foregoing temperature and cured before application of clear coating composition.

In the coating method of the invention, the base coating and the clear coating are cured chiefly by crosslinking reaction caused by the action of crosslinking agent in the coatings.

The present composition is characterized in that the core/shell polymer particles in the emulsion has the core united with the shell by a specific method. And the present coating composition is characterized in that it comprises the present composition and a crosslinking agent. The following technical advantages result from said features of the invention.

(1) The polymerizable unsaturated bond can be easily introduced into the core in the step (II) and the copolymerization can be performed conveniently in the step (III), with the result that the core and the shell can be chemically united together with ease.

(2) In the step (III), the carboxyl group in the shell is neutralized whereupon the polymer molecules in the shell are partially or entirely dissolved and diffused in the aqueous medium, making the composition thixotropic. With the thixotropy, the present composition exhibits little or no decrease of viscosity when subjected to great shear force because the core is chemically united with the shell as stated above. In consequence, the present coating composition comprising the present composition and a crosslinking agent gives a coating which would be unlikely to sag even when applied after submission to great shear force.

(3) The present coating composition provides a coating which would be unlikely to sag when applied under high-humidity circumstances for the reason set out above in (2).

(4) The core/shell portions of the particles in the present coating composition swell due to contact with an organic solvent but in a lesser degree than in conventional coating compositions. Accordingly the present coating composition undergoes no undesirable change in properties (such as storage stability, mechanical stability, circulation stability, etc.) if the coating composition contains an organic solvent or an organic solvent-containing component (e.g. pigment paste and the like). Moreover, an organic solvent-diluted coating composition can be applied over the surface of uncured (wet) coating formed from the present coating composition.

In comparison on swelling due to organic solvent, the present coating compositions exhibited a three-fold or less swelling in most cases, whereas coating compositions with the core and shell not chemically united generally showed a four-fold or more swelling. In the comparison, ethanol was used as an organic solvent and the particle size was measured by "COULTER N-4" (sub-micron particle analyzer manufactured by Coulter Electronics Inc.).

(5) Since the core of the particles in the present coating composition contains a silane monomer and has silanol group on the surface thereof, the core/shell particles have cohesion sufficient to remain free of sedimentation. This factor, coupled with the characteristic stated above in (2), contributes to prevention of sagging.

(6) The present coating composition because of the crosslinking agent present therein can form a coating which, when heated, becomes three-dimensionally crosslinked on reaction of the crosslinking agent with the hydroxyl group in the composition. Consequently the formed coating is excellent in water resistance, chemical resistance, weatherability, physical properties, etc.

With these advantages, the present coating composition is significantly suitable for use as an aqueous base coat composition in the two-coat method. Therefore the coating method of the invention has the advantages of forming a coating excellent in surface smoothness, adhesion, particularly adhesion between layers, gloss, metallic effect, water resistance, etc.

The present invention will be described below in greater detail with reference to the following Examples and Comparison Examples in which the parts and the percentages are all by weight.

I. Preparation of Present Composition

Examples 1 to 6 and Comparison Examples 1 to 3

Water-dispersible resin compositions were prepared using the monomers shown below in Table 1.

Step (I)

A flask was charged with 120 parts of deionized water, which was then heated to 80° to 85° C. Two parts of the first pre-emulsion shown in Table 1 was added dropwise with stirring. After the mixture was aged for 20 minutes, the remaining portion of the first pre-emulsion was added dropwise at a constant rate and the same temperature over a period of 3 hours, giving an aqueous dispersion of three-dimensionally crosslinked particulate polymer as a core.

Step (II)

A silane monomer was added dropwise to the aqueous dispersion upon completion of addition of first pre-emulsion. The mixture was maintained at 80° to 85° C. for 1 hour to react the silane monomer on the surface of the core.

Step (III)

Fifty parts of deionized water was added and the second pre-emulsion shown in Table 1 was added dropwise at a constant rate at 80° to 85° C. over a period of 1 hour.

Subsequently a solution of 0.06 part of ammonium persulfate in 18 parts of deionized water was added dropwise at the same temperature over a period of 1 hour. The mixture was maintained at the same temperature for 1 hour and rapidly cooled to room temperature after which deionized water was added to provide a solids content of 30%. The thus obtained particulate polymer was insoluble in an organic solvent. Then deionized water was added and the mixture was neutralized with dimethylethanolamine and adjusted to a 20% solids content, producing a core/shell type water-dispersible resin composition.

TABLE 1

|  | Example 1 | 2 | 3 | 4 | 5 | 6 | Comp. Ex. 1 | 2 | 3 |
|---|---|---|---|---|---|---|---|---|---|
| Step (I) | | | | | | | | | |
| **First Pre-emulsion (*1)** | | | | | | | | | |
| γ-Methacryloxy propyl trimethoxy silane | 2 | 4 | | 2 | 2 | 2 | 2 | | |
| Vinyl trimethoxy silane | | | 2 | | | | | | |
| Styrene | 20 | 20 | 20 | 20 | 20 | 20 | 20 | 20 | |
| Methyl methacrylate | 23 | 21 | 23 | 23 | 23 | 23 | 23 | 22 | 41 |
| Butyl acrylate | 40 | 40 | 40 | 40 | 40 | 40 | 40 | 40 | 40 |
| Methyl acrylate | 15 | 15 | 15 | 15 | 15 | 15 | 15 | 15 | 15 |
| Allyl acrylate | | | | | | | | 3 | |
| Ethylene glycol dimethacrylate | | | | | | | | | 2 |
| MGA (*2) | | | | | | | | | 2 |
| Ammonium salt of polyoxyethylene nonylphenyl ether sulfate | 1.5 | 1.5 | 1.5 | 1.5 | 1.5 | 1.5 | 1.5 | 1.5 | 1.5 |
| Ammonium persulfate | 0.4 | 0.4 | 0.4 | 0.4 | 0.4 | 0.4 | 0.4 | 0.4 | 0.4 |
| Deionized water | 45 | 45 | 45 | 45 | 45 | 45 | 45 | 45 | 45 |
| Step (II) | | | | | | | | | |
| γ-Methacryloxy propyl trimethoxy silane | 2 | 4 | | 2 | 2 | 2 | — | — | — |
| Vinyl trimethoxy silane | | | 2 | | | | | | |
| Step (III) | | | | | | | | | |
| **Second Pre-emulsion (*1)** | | | | | | | | | |
| Acrylic acid | 16 | 16 | 16 | 16 | 16 | | 16 | 16 | 16 |
| Methacrylic acid | | | | | | 20 | | | |
| Styrene | 12 | 12 | 12 | 12 | 12 | 12 | 12 | 12 | 20 |
| Methyl methacrylate | 16 | 16 | 16 | 16 | 16 | 16 | 16 | 16 | 16 |
| Butyl acrylate | 40 | 40 | 40 | 40 | 40 | 36 | 40 | 40 | 40 |
| Ethyl acrylate | 16 | 16 | 16 | 16 | 16 | 16 | 16 | 16 | 16 |
| Ammonium salt of polyoxyethylene nonylphenyl ether sulfate | 0.3 | 0.3 | 0.3 | 0.3 | 0.3 | 0.3 | 0.3 | 0.3 | 0.3 |
| Ammonium persulfate | 0.02 | 0.02 | 0.02 | 0.02 | 0.02 | 0.02 | 0.02 | 0.02 | 0.02 |
| Deionized water | 12 | 12 | 12 | 12 | 12 | 12 | 12 | 12 | 12 |
| First Pre-emulsion/Second Pre-emulsion (Weight ratio of monomers) (*3) | 80/20 | 80/20 | 80/20 | 70/30 | 90/10 | 80/20 | 80/20 | 80/20 | 80/20 |
| Before neutralization | | | | | | | | | |
| Particle size (nm) (*5) | 110 | 134 | 130 | 138 | 95 | 108 | 105 | 110 | 95 |
| pH | 2.5 | 2.4 | 2.3 | 2.2 | 2.9 | 2.2 | 2.5 | 2.9 | 2.4 |
| **After neutralization (*4)** | | | | | | | | | |
| Particle size (nm) (*5) | 112 | 135 | 132 | 144 | 95 | 107 | 106 | 112 | 96 |
| pH | 7.5 | 7.5 | 7.5 | 7.5 | 7.5 | 7.5 | 7.5 | 7.5 | 7.5 |

The symbols *1 to *5 used in Table 1 designate the following.
(*1) Pre-emulsion: An emulsion prepared by uniformly dispersing the mixture of the listed components by a highspeed stirrer.
(*2) MGA: A compound represented by the formula

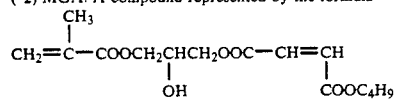

(*3) Ratio by weight of polymerizable monomers contained in each pre-emulsion
(*4) Dimethylethanolamine was used for neutralization.
(*5) Measured by "COULTER N-4" (sub-micron particle analyzer manufactured by Coulter Electronics Inc.).

The water-dispersible resin compositions prepared in the Examples and Comparison Examples were tested singly or in mixture with a usual cold-curing emulsion coating composition in a ratio by weight of 50/50 calculated as solids.

The amenability to coating operation was expressed in terms of sagging resistance, which was determined in the following manner. The coating composition (specimen) was applied by a spray coater to a slate sheet (5 mm in thickness) vertically disposed and having a hole, 1 cm in diameter, to form a coating of 20 μm thickness when dried. The coated sheet was dried at room temperature, and the length (unit: mm) of sagging of the applied composition formed downward from the hole was measured.

The mechanical stability is the result obtained by testing singly the water-dispersible resin compositions prepared in the Examples and Comparison Examples, and was evaluated in terms of viscosity stability and TI value-retaining percentage (to be clarified below). The viscosity stability was given by the following procedure. A viscosity ($\eta_0$) was determined by a Brookfield viscometer (rotating the agitating blade at 6 rpm) after the composition was left to stand for 24 hours at room temperature. Thereafter the composition was stirred at room temperature for 3 minutes by a stirrer (rotating the agitating blade at about 800 rpm). Then after standing for 5 minutes, a viscosity ($\eta_1$) was measured in the same manner as above. The ratio of $\eta_1/\eta_0$ was calculated to present the viscosity stability. The TI value-retaining percentage was provided by the following method. After the composition was left to stand at room temperature for 24 hours, viscosities $\eta_6$ and $\eta_{60}$ were determined by Brookfield viscometer rotating the agitating blade at 6 rpm and 60 rpm, respectively and a viscosity ratio $TI_0(=\eta_6/\eta_{60})$ was calculated. Subsequently the contemplated emulsion coating composition. composition was stirred at room temperature for 3 minutes by a stirrer rotating the agitating blade at about 800 rpm. After standing for 5 minutes, viscosities $\eta_6$ and $\eta_{60}$ were measured by a Brookfield viscometer rotating the agitating blade at 6 rpm and 60 rpm, respectively to obtain a viscosity ratio $TI_1(=\eta_6/\eta_{60})$. A percentage was given by the following equation: $(TI_1/TI_0) \times 100$ (%) (which is termed herein TI value-retaining percentage).

The usual cold-curing emulsion coating composition to be mixed with the composition (specimen) was prepared by the following process. Maleinized 1,2-vinyl polybutadiene having a number-average molecular weight of about 3,000 and an acid value of about 100 was dissolved in ethylene glycol monobutyl ether to a solids content of 74%. A 216 g portion of the solution was neutralized with ammonia to 0.95 equivalent, and dissolved in 780 g of water. Added thereto was 414 g of n-butyl methacrylate, and the mixture was thoroughly stirred to obtain an emulsion to which a solution of 1 g of ammonium persulfate in 20 g of water was added. The mixture was heated and maintained at 80° C. for 2 hours, giving the contemplated emulsion coating composition.

Table 2 below shows the results.

TABLE 2

| Amenability to coating operation | Example | | | | | | Comp. Ex. | | |
|---|---|---|---|---|---|---|---|---|---|
| | 1 | 2 | 3 | 4 | 5 | 6 | 1 | 2 | 3 |
| Specimen singly used | | | | | | | | | |
| Humidity 70% | 2.5 | 1.8 | 2.5 | 2.5 | 2.3 | 2.4 | 4.5 | 5.3 | 4.7 |
| Humidity 90% | 3.7 | 3.0 | 4.0 | 4.0 | 3.6 | 3.5 | 7.4 | 8.6 | 7.9 |
| Specimen in mixture | | | | | | | | | |
| Humidity 70% | 3.4 | 2.9 | 3.8 | 4.1 | 3.7 | 3.9 | 7.0 | 7.0 | 6.8 |
| Humidity 90% | 6.0 | 5.5 | 6.7 | 6.9 | 6.0 | 6.8 | 11.5 | 13.4 | 11.3 |
| Mechanical stability | | | | | | | | | |
| Viscosity stability | 0.96 | 0.98 | 0.93 | 0.91 | 1.0 | 0.98 | 0.80 | 0.83 | 0.85 |
| TI-value retaining percentage (%) | 85 | 91 | 80 | 81 | 97 | 88 | 60 | 65 | 67 |

II. Preparation of Water-Dispersible Coating Composition of the Invention

II-1 Preparation of Present Composition

The present compositions were prepared using the monomers shown below in Table 3.

Step (I)

Deionized water (120 parts) was placed into a flask and heated at 80° to 85° C. The first pre-emulsion (2 parts) as shown in Table 3 below was added dropwise with stirring. After the mixture was aged for 20 minutes, the remaining amount of first pre-emulsion was added dropwise at a constant rate and the same temperature over a period of 3 hours to obtain an aqueous dispersion of three-dimensionally crosslinked particulate polymer as a core.

Step (II)

On completion of addition of first pre-emulsion, a silane monomer and an allyl methacrylate were added dropwise. The mixture was maintained at 80° to 85° C. for 1 hour to react the silane monomer and the allyl methacrylate on the surface of the core.

Step (III)

Fifty parts of deionized water was charged and the second pre-emulsion shown below in Table 3 was added dropwise at 80° to 85° C. at a constant rate over a period of 1 hour.

The mixture was maintained at the same temperature for 1 hour and rapidly cooled to room temperature. Deionized water was added to achieve a solids content of 30%. The obtained particulate polymer was insoluble in an organic solvent. Deionized water was added and the mixture was neutralized with dimethylethanolamine and adjusted to a 20% solids content, producing a core-shell type composition EM-1 according to the invention. In this way, there were prepared nine specimens EM-1 to EM-9 among which specimens EM-7 to EM-9 are for comparison.

TABLE 3

| | Specimen | | | | | | | | |
|---|---|---|---|---|---|---|---|---|---|
| | EM-1 | EM-2 | EM-3 | EM-4 | EM-5 | EM-6 | EM-7 | EM-8 | EM-9 |
| Step (I) | | | | | | | | | |
| First Pre-emulsion (*1) | | | | | | | | | |
| γ-Methacryloxy propyl trimethoxy silane | 2 | 4 | | 2 | 4 | | 2 | | |
| Vinyl trimethoxy silane | | | 2 | | | 2 | | | |
| Styrene | 20 | 20 | 20 | 20 | 20 | 20 | 20 | 20 | |
| Methyl methacrylate | 20 | 23 | 25 | 23 | 20 | 23 | 20 | 20 | 38 |
| Butyl acrylate | 43 | 43 | 40 | 40 | 43 | 45 | 43 | 43 | 43 |
| Hydroxypropyl methacrylate | 15 | 10 | 13 | 15 | 13 | 10 | 15 | 15 | 15 |
| Allyl acrylate | | | | | | | | 2 | |
| Ethylene glycol dimethacrylate | | | | | | | | | 2 |
| MGA (*2) | | | | | | | | | 2 |
| Ammonium salt of polyoxyethylene nonylphenyl ether sulfate | 1.5 | 1.5 | 1.5 | 1.5 | 1.5 | 1.5 | 1.5 | 1.5 | 1.5 |
| Ammonium persulfate | 0.4 | 0.4 | 0.4 | 0.4 | 0.4 | 0.4 | 0.4 | 0.4 | 0.4 |
| Deionized water | 45 | 45 | 45 | 45 | 45 | 45 | 45 | 45 | 45 |
| Step (II) | | | | | | | | | |
| γ-Methacryloxy propyl trimethoxy silane | 2 | 4 | | 2 | | 2 | 2 | | |
| Vinyl trimethoxy silane | | | 2 | | | | | | |
| Allyl methacrylate | 2 | 2 | 3 | 2 | 2 | 2 | | | |
| Step (III) | | | | | | | | | |

TABLE 3-continued

| | Specimen | | | | | | | | |
|---|---|---|---|---|---|---|---|---|---|
| | EM-1 | EM-2 | EM-3 | EM-4 | EM-5 | EM-6 | EM-7 | EM-8 | EM-9 |
| Second Pre-emulsion (*1) | | | | | | | | | |
| Acrylic acid | 16 | | 18 | 16 | 16 | | 16 | 16 | 16 |
| Methacrylic acid | | 16 | | | | 20 | | | |
| Styrene | 12 | 12 | 12 | 12 | 12 | 12 | 12 | 12 | 12 |
| Methyl methacrylate | 20 | 18 | 18 | 24 | 22 | 16 | 20 | 20 | 20 |
| Butyl acrylate | 44 | 44 | 40 | 40 | 40 | 40 | 44 | 44 | 44 |
| Hydroxyethyl acrylate | 8 | 10 | 12 | 8 | 10 | 12 | 8 | 8 | 8 |
| Ammonium salt of polyoxyethylene nonylphenyl ether sulfate | 0.3 | 0.3 | 0.3 | 0.3 | 0.3 | 0.3 | 0.3 | 0.3 | 0.3 |
| Ammonium persulfate | 0.2 | 0.2 | 0.2 | 0.2 | 0.2 | 0.2 | 0.2 | 0.2 | 0.2 |
| Deionized water | 12 | 12 | 12 | 12 | 12 | 12 | 12 | 12 | 12 |
| First Pre-emulsion/Second Pre-emulsion (Weight ratio of monomers) (*3) | 80/20 | 80/20 | 80/20 | 70/30 | 80/20 | 90/10 | 80/20 | 80/20 | 80/20 |
| Before neutralization | | | | | | | | | |
| Particle size (nm) (*5) | 121 | 131 | 130 | 110 | 135 | 103 | 110 | 115 | 106 |
| pH | 2.3 | 2.4 | 2.2 | 2.6 | 2.8 | 2.5 | 2.3 | 2.5 | 2.5 |
| After neutralization (*4) | | | | | | | | | |
| Particle size (nm) (*5) | 124 | 132 | 135 | 118 | 138 | 110 | 110 | 113 | 108 |
| pH | 7.5 | 7.5 | 7.5 | 7.5 | 7.5 | 7.5 | 7.5 | 7.5 | 7.5 |

The symbols *1-*5 used in Table 3 designate the same as in Table 1.

II-2 Preparation of Crosslinking Agents

(1) H-1

A hydrophobic melamine resin A (*6) was placed into a container with a stirrer in an amount to provide a solids content of 25 parts. Twenty parts of aqueous solution of acrylic resin (*7) was added. Then the mixture was stirred by a stirrer rotating the agitating blade at 1,000 to 1,500 rpm while 88.75 parts of deionized water was gradually added. Thereafter stirring was further continued for 30 minutes so that the hydrophobic melamine resin was coated with the water-soluble acrylic resin, giving an aqueous dispersion of crosslinking agent H-1 in the form of particles 0.11 μm in mean particle size.

(6*) Preparation of Hydrophobic Melamine Resin A

Into a 2 l four-necked flask equipped with a thermometer, a stirrer and a reflux condenser were placed 126 parts of melamine, 225 parts of 80% p-formalin (product of Mitsui Toatsu Chemicals Inc.) and 592 parts of n-butanol. The mixture was adjusted to a pH of 9.5 to 10.0 with a 10% aqueous solution of sodium hydroxide, and reacted at 80° C. for 1 hour.

Then 888 parts of n-butanol was added. Then the mixture was adjusted to a pH of 5.5 to 6.0 with a 5% aqueous solution of sulfuric acid and reacted at 80° C. for 3 hours. After completion of reaction, the reaction mixture was neutralized to a pH of 7 to 7.5 with a 20% aqueous solution of sodium hydroxide and was concentrated under reduced pressure at 60° to 70° C. The concentrate was filtered to obtain a melamine resin A.

The analysis of the resin showed that the resin had a nonvolatile content of 80%, a solvent dilution ratio of 3.6 given using a water/methanol solvent mixture (ratio by weight of 35/65) (hereinafter simply referred to as "solvent dilution ratio"), and a weight-average molecular weight of 800.

(*7) Preparation of Aqueous Solution of Acrylic Resin

Into a reactor were placed 60 parts of butyl cellosolve and 15 parts of isobutyl alcohol. The mixture was heated to 115° C. in a nitrogen stream. After the temperature reached 115°, there was added over a 3-hour period a mixture of 26 parts of n-butyl acrylate, 47 parts of methyl methacrylate, 10 parts of styrene, 10 parts of 2-hydroxyethyl methacrylate, 6 parts of acrylic acid and part of azoisobutyronitrile. After addition, the mixture was aged at 115° C. for 30 minutes. A mixture of 1 part of azobisisobutyronitrile and 115 parts of butyl cellosolve was added over a 1-hour period. After aging for 30 minutes, the mixture was filtered through 200-mesh nylon cloth at 50° C.

The obtained reaction product had an acid value of 48 and a viscosity of $Z_4$ (Gardner-bubble viscometer), and a nonvolatile content of 55%. The product was neutralized with dimethylethanolamine to an equivalent and deionized water was added, producing a 50% aqueous solution of acrylic resin WA.

(2) H-2

The same procedure as in H-1 was repeated with the exception of using a commercially available hydrophobic melamine resin B ("Superbeckamin L-127-75B", product of Dainippon Ink and Chemicals, Inc., nonvolatile content of 80%, solvent dilution ratio of 0.5, and weight-average molecular weight of 1,400 to 1,800) in place the hydrophobic melamine resin A used in H-1, giving an aqueous dispersion of crosslinking agent H-2 in the form of particles 0.12 μm in mean particle size.

II-3 Preparation of Dispersions of Pigment

(1) P-1 : Preparation of Concentrated Dispersion Aluminum Pigment

Into a container with a stirrer were placed 23 parts of aluminum paste (65% metal content) and 25 parts of butyl cellosolve. The mixture was stirred for 1 hour, providing a concentrated dispersion of aluminum pigment P-1.

(2) P-2

Into a container with a stirrer were placed 100 parts of titanium white, 10 parts of butyl cellosolve, 30 parts of a 50% aqueous solution of acrylic resin WA as obtained in the same manner as above in *7 and 40 parts water. The mixture was homogeneously mixed and dispersed by a high-speed stirrer, giving a concentrated white dispersion P-2.

II-4 Preparation of Transparent Top Coat Compositions

(1) T-1

Copolymerization was conducted in xylene using 25 parts of styrene, 25 parts of 2-ethylhexyl methacrylate, 36.5 parts of n-butyl methacrylate, 12 parts of 2-hydroxyethyl acrylate, 1.5 parts of acrylic acid and 2.5 parts of a polymerization initiator ($\alpha,\alpha'$-azobisisobutyronitrile), producing a solution of acrylic resin with a resin solids content of 60%. The resin had a hydroxyl value of 58 and an acid value of 12.

This resin and "Uban 20SE" (n-butanol-modified melamine resin manufactured by Mitsui Toatsu Chemicals Inc., nonvolatile content of 60%, solvent dilution ratio of 0.4 and weight-average molecular weight of 3,000 to 4,000) were mixed together in a ratio of 75:25 (by weight of solids). The mixture was adjusted to a viscosity of 25 seconds (Ford cup #4°/20° C.) with "Swasol #1500" (trademark for organic solvent manufactured by Cosmo Oil Co. Ltd.), giving a clear coating composition T-1.

(2) T-2

Into a three-necked flask equipped with a stirrer and a reflux condenser were placed 20 parts of styrene, 43 parts of methyl methacrylate, 18 parts of n-butyl acrylate, 3 parts of ethyl acrylate, 13 parts of glycidyl methacrylate, 3 parts of hydroxyethyl methacrylate and 100 parts of toluol. After addition of 1.5 parts of benzoyl peroxide, the mixture was heated until the temperature of contents reached 90° to 100° C. The mixture was maintained at this temperature for 3 hours and a further 2 parts of benzoyl peroxide was added. The mixture was then maintained at the same temperature for 4 hours to complete the copolymerization. The thus obtained copolymer was left to stand, solidified and pulverized by a crusher to 6 minus-mesh particles, producing an acrylic resin powder.

A 100-part portion of the acrylic resin powder was mixed with 13 parts of decanedicarboxylic acid and part of coating surface improver (product of Mitsubishi Monsant Chemical Co., Ltd., "Modaflow"). The mixture was melted and kneaded at about 100° C. for 10 minutes by a heating roll. After cooling, the mass was finely divided to a particle size of 20 to 100 μm, producing a clear coating composition T-2.

Examples 7 to 20 and Comparison Examples 4 to 12

Water-dispersible coating compositions of the invention and those for comparison were preapred using the present compositions or comparison compositions, crosslinking agents and, optionally, dispersions of pigment obtained above in Examples.

The water-dispersible coating compositions or those for comparison having the solids contents as shown below in Table 4 were prepared by homogeneously mixing and dispersing the present compositions or comparison compositions, crosslinking agents and, optionally, dispersions of pigment and adding 2.9 to 2.1 parts of "Acrysol ASE-60" (trademark for a thickener manufactured by Rohm and Haas Co.) and 0.27 to 0.20 part of dimethylethanolamine to adjust the mixture to an apparent viscosity of 3,000 cps/6 rpm (Brookfield viscometer) and a pH of 7.80.

TABLE 4

| | Composition | | Crosslinking agent | | Pigment dispersion | | Solids content (%) |
|---|---|---|---|---|---|---|---|
| | Kind | A-mount | Kind | A-mount | Kind | A-mount | |
| Ex. | | | | | | | |
| 7 | EM-1 | 325 | H-1 | 140 | — | — | 21.5 |
| 8 | EM-2 | 325 | H-1 | 140 | — | — | 21.5 |
| 9 | EM-3 | 300 | H-1 | 160 | — | — | 21.7 |
| 10 | EM-4 | 300 | H-2 | 160 | — | — | 21.7 |
| 11 | EM-5 | 350 | H-2 | 120 | — | — | 21.3 |
| 12 | EM-6 | 350 | H-2 | 120 | — | — | 21.3 |
| Comp. Ex. | | | | | | | |
| 4 | EM-7 | 325 | H-1 | 140 | — | — | 21.5 |
| 5 | EM-8 | 325 | H-1 | 140 | — | — | 21.5 |
| 6 | EM-9 | 325 | H-1 | 140 | — | — | 21.5 |
| Ex. | | | | | | | |
| 13 | EM-1 | 350 | H-1 | 120 | P-1 | 42 | 22.1 |
| 14 | EM-2 | 350 | H-1 | 120 | P-1 | 42 | 22.1 |
| 15 | EM-5 | 300 | H-2 | 160 | P-1 | 55 | 22.7 |
| 16 | EM-6 | 300 | H-2 | 160 | P-1 | 55 | 22.7 |
| Comp. Ex. | | | | | | | |
| 7 | EM-7 | 350 | H-1 | 120 | P-1 | 42 | 22.1 |
| 8 | EM-8 | 350 | H-1 | 120 | P-1 | 42 | 22.1 |
| 9 | EM-9 | 350 | H-1 | 120 | P-1 | 42 | 22.1 |
| Ex. | | | | | | | |
| 17 | EM-1 | 300 | H-1 | 160 | P-2 | 181 | 33.6 |
| 18 | EM-2 | 300 | H-1 | 160 | P-2 | 181 | 33.6 |
| 19 | EM-3 | 350 | H-2 | 120 | P-2 | 181 | 33.1 |
| 20 | EM-4 | 350 | H-2 | 120 | P-2 | 181 | 33.1 |
| Comp. Ex. | | | | | | | |
| 10 | EM-7 | 300 | H-1 | 160 | P-2 | 181 | 33.6 |
| 11 | EM-8 | 300 | H-1 | 160 | P-2 | 181 | 33.6 |
| 12 | EM-9 | 300 | H-1 | 160 | P-2 | 181 | 33.6 |

Examples 21 to 28 and Comparison Examples 13 to 18

Coating films were each formed from the water-dispersible pigment-containing coating compositions (base coat compositions) prepared above in Examples 13 to 20 and Comparison Examples 7 to 12, respectively and the transparent top coat compositions by the two-coat one-bake method.

Substrates to be coated were prepared by the following method. A steel panel (7.5×15×0.2 cm) was surface-treated with "BONDERITE #3030" (trademark for zinc sulfate type primer manufactured by Nihon Parkerizing Co., Ltd.). The primed panel was coated with "ELECRON No.9200" (trademark for epoxy-type cationic electrodeposition coating composition manufactured by Kansai Paint Co., Ltd.). Then the coated panel was coated with "Amilac Sealer" (trademark for aminopolyester resin-type intercoat composition manufactured by Kansai Paint Co., Ltd.).

Table 5 below shows the the kind and other specific conditions of water-dispersible coating compositions and transparent top coat compositions.

The applications were carried out in a manner described below. Deionized water was added to the water-dispersible coating composition as the base coat composition to a solids content of 20%. The dispersion was adjusted to a viscosity of 1,000 to 2,000 cPs with a thickener and applied to the substrate at 25° C. and RH of 70 or 90% by electrostatic spraying to a thickness as shown in Table 5. Then the coated substrate was heated at room temperature or 100° C. or lower until the water content of coating reached 10% by weight or less. The transparent top coat composition was applied to the coated substrate by electrostatic spraying and the two coatings were concurrently cured by heating. Table 5 below shows the thickness of top coating and the heating conditions for curing.

TABLE 5

| | Base coating | | Top coating | | |
|---|---|---|---|---|---|
| | Kind | Film Thickness ($\mu$) | Kind | Film thickness ($\mu$) | Heating (°C-min.) |
| Ex. | | | | | |
| 21 | 13 | 13–15 | T-1 | 40 | 140-30 |
| 22 | 14 | 13–15 | T-2 | 50 | 160-30 |
| 23 | 15 | 13–15 | T-1 | 40 | 140-30 |
| 24 | 16 | 13–15 | T-2 | 50 | 160-30 |
| 25 | 17 | 25–30 | T-1 | 40 | 140-30 |
| 26 | 18 | 25–30 | T-1 | 40 | 140-30 |
| 27 | 19 | 25–30 | T-2 | 50 | 160-30 |
| 28 | 20 | 25–30 | T-2 | 50 | 160-30 |
| Comp. Ex. | | | | | |
| 13 | 7 | 13–15 | T-1 | 40 | 140-30 |
| 14 | 8 | 13–15 | T-1 | 40 | 140-30 |
| 15 | 9 | 13–15 | T-1 | 40 | 140-30 |
| 16 | 10 | 25–30 | T-1 | 40 | 140-30 |
| 17 | 11 | 25–30 | T-1 | 40 | 140-30 |
| 18 | 12 | 25–30 | T-1 | 40 | 140-30 |

(Note)
1. The kinds of base coat compositions are shown in Table 5 with the numbers of Examples or Comparison Examples appearing in Table 4.
2. The thicknesses indicated in Table 5 are those of the cured coating films.

III. Results of Performance Test

Performance tests were conducted using the water-dispersible coating compositions prepared in Examples 7 to 12 and Comparison Examples 4 to 6, base coat compositions used in Examples 21 to 28 and Comparison Examples 13 to 18, and coatings formed from these coating compositions. The water-dispersible coating compositions prepared in Examples 7 to 12 and Comparison Examples 4 to 6 were each applied by spraying to aforesaid substrates to a thickness of 15 $\mu$m (when cured) and the coated substrates were heated at 140° C. for 30 minutes to obtain cured coating films. The results are shown below in Table 6.

The test methods are as follows.

Sagging

To check sagging, the substrate with a hole, 1 cm in diameter, was perpendicularly disposed. The base coat composition and the top coat composition were applied to the substrate in the same manner as above and cured. The length (mm) of sagging of the applied composition running downward from the hole was measured. The top coat composition was not applied in testing the compositions of Examples 7 to 12 and Comparison Examples 4 to 6.

Mottling

The substrate was coated with metallic coating in the same manner as in the sagging test. The coated substrate was observed to check the metallic mottling. In Table 6, the mark A represents no or little mottling, the mark B a high degree of mottling, and the mark C a significant degree of mottling.

Surface Smoothness

The coating surface was inspected with the unaided eye to evaluate the surface smoothness. In Table 6, the mark A shows a good surface smoothness, the mark B a poor one and the mark C a markedly poor one.

Adhesion

The coated substrate was cut crosswise with a cutter knife to the substrate so that parallel cuts are provided in a checkerboard-like pattern with a spacing of 1 mm between adjacent cuts to produce 100 squares (each 1 cm$^2$). An adhesive cellophane tape was adhered to the cut coating surface, and the tape was peeled off with a strong force to evaluate the adhesiveness. In Table 6, the mark A represents no peeling, the mark B a little peeling between the base coating and the top coating and the mark C a marked degree of peeling between the coatings.

Gloss

The gloss was determined in terms of specular gloss (60°).

Water Resistance

The coated substrate was immersed in water at 40° C. for 360 hours after which the coating surface was visually inspected. In Table 6, the mark A shows no undesired change, the mark B a little blistering and the mark C a marked degree of blistering.

Storability

The storability was expressed in a ratio (times) of increased viscosity to the initial viscosity (cps/6 rpm, Brookfield viscometer) in respect of the water-dispersible coating compositions stored at 40° C. for 20 days.

Mechanical Stability

The mechanical stability is the result obtained by testing singly the water-dispersible coating compositions prepared in the Examples and Comparison Examples, and was evaluated in terms of viscosity stability and TI value-retaining percentage (to be clarified below). The viscosity stability was given by the following procedure. A viscosity ($\eta_0$) was determined by Brookfield viscometer (rotating the agitating blade at 6 rpm) after the composition was left to stand for 24 hours at room temperature. Thereafter the composition was stirred at room temperature for 3 minutes by a stirrer (rotating the agitating blade at about 800 rpm). Then after standing for 5 minutes, a viscosity ($\eta_1$) was measured in the same manner as above. The ratio of $\eta_1/\eta_0$ was calculated to present the viscosity stability. The TI value-retaining percentage was provided by the following method. After the composition was left to stand at room temperature for 24 hours, viscosities $\eta_6$ and $\eta_{60}$ were determined by Brookfield viscometer rotating the agitating blade at 6 rpm and 60 rpm, respectively and a viscosity ratio $TI_0 (= \eta_6/\eta_{60})$ was calculated. Subsequently the composition was stirred at room temperature for 3 minutes by a stirrer rotating the agitating blade at about 800 rpm. After standing for 5 minutes, viscocities $\eta_6$ and $\eta_{60}$ were measured by Brookfield viscometer rotaing the agitating blade at 6 rpm and 60 rpm, respectively to obtain a viscosity ratio $TI_1 (= \eta_6/\eta_{60})$. The TI value-retaining percentage was obtained by the following equation: $(TI_1/TI_0) \times 100$ (%).

TABLE 6

|  | Relative humidity 70% | | Relative humidity 90% | | Surface smoothness | Adhesion | Gloss | Water resistance | Storability | Mechanical stability | |
|---|---|---|---|---|---|---|---|---|---|---|---|
|  | Sagging | Mottling | Sagging | Mottling |  |  |  |  |  | (A) | (B) |
| Ex. | | | | | | | | | | | |
| 7 | 1.2 | | 2.5 | | A | A | 100 | | 1.0 | 1.0 | 95 |
| 8 | 1.0 | | 2.3 | | A | A | 100 | | 1.1 | 1.0 | 92 |
| 9 | 0.9 | | 2.1 | | A | A | 99 | | 1.1 | 1.0 | 93 |
| 10 | 1.4 | | 2.8 | | A | A | 100 | | 1.0 | 1.0 | 92 |
| 11 | 1.1 | | 2.3 | | A | A | 99 | | 1.2 | 1.0 | 94 |
| 12 | 1.3 | | 2.7 | | A | A | 100 | | 1.1 | 1.0 | 92 |
| Comp. Ex. | | | | | | | | | | | |
| 4 | 4.1 | | 6.0 | | A | A | 100 | | 1.2 | 0.85 | 67 |
| 5 | 4.3 | | 6.3 | | A | A | 100 | | 1.3 | 0.87 | 68 |
| 6 | 4.0 | | 6.2 | | A | A | 100 | | 1.3 | 0.88 | 69 |
| Ex. | | | | | | | | | | | |
| 21 | 2.1 | A | 3.3 | A | A | A | 100 | A | 1.0 | 0.98 | 90 |
| 22 | 2.0 | A | 3.2 | A | A | A | 98 | A | 1.1 | 0.97 | 89 |
| 23 | 2.0 | A | 3.0 | A | A | A | 103 | A | 1.2 | 1.0 | 93 |
| 24 | 2.2 | A | 3.4 | A | A | A | 98 | A | 1.1 | 0.98 | 80 |
| 25 | 3.2 | | 3.8 | | A | A | 98 | A | 1.2 | 0.99 | 92 |
| 26 | 3.1 | | 3.7 | | A | A | 97 | A | 1.2 | 0.98 | 90 |
| 27 | 3.0 | | 3.5 | | A | A | 96 | A | 1.1 | 1.0 | 93 |
| 28 | 3.1 | | 3.8 | | A | A | 96 | A | 1.2 | 0.98 | 91 |
| Comp. Ex. | | | | | | | | | | | |
| 13 | 6.0 | B | 15.4 | B | A | A | 100 | A | 1.2 | 0.81 | 60 |
| 14 | 6.2 | B | 20.3 | B | A | A | 100 | A | 1.3 | 0.80 | 63 |
| 15 | 6.1 | B | 18.2 | B | A | A | 100 | A | 1.3 | 0.82 | 64 |
| 16 | 7.2 | | 20.1 | | A | A | 95 | A | 1.4 | 0.84 | 72 |
| 17 | 7.5 | | 23.4 | | A | A | 93 | A | 1.5 | 0.86 | 74 |
| 18 | 7.3 | | 21.9 | | A | A | 94 | A | 1.4 | 0.87 | 76 |

We claim:

1. A water-dispersible coating composition comprising a cross-linking agent selected from the group consisting of methylolated amino resins and these resins as etherified with alkyl, and a water-dispersible resin composition prepared by a process comprising;
   (I) reacting a silane monomer (A) having hydrolytic functional groups and/or silanol groups and a polymerizable unsaturated bond with a hydroxy-containing vinyl monomer selected from the group consisting of hydroxy $C_{2-10}$ alkyl acrylates and methacrylates and another vinyl monomer (B) in an aqueous medium to obtain a three-dimensional cross-linked particulate polymer, (II) reacting the obtained particulate polymer with the silane monomer (A) and/or an allyl acrylate or allyl methacrylate (C), and (III) copolymerizing the resulting reaction product with a vinyl monomer component comprising a carboxyl-containing vinyl monomer (D), followed by neutralizing the carboxyl group, whereby a particulate polymer having a core/shell structure is obtained.

2. A coating composition according to claim 1 wherein the preparation of each monomer to be used in the step (I) is about 0.5 to about 20% by weight of the silane monomer (A), about 1 to about 30% by weight of the hydroxyl-containing vinyl monomer and about 98.5 to about 50% by weight of the other monomer based on the combined weight of the total monomers used in the step (I).

3. A coating composition according to claim 1 wherein the amino resin is a hydrophobic melamine resin.

4. A coating composition according to claim 1 wherein about 10 to about 50% by weight of the cross-linking agent is used based on the combined weight of the resin solids in the water-dispersible resin composition (inclusive of the resin solids in the other resin or resins used when so required) and the crosslinking agent.

5. A coating method characterized by using as a base coat composition a water-dispersible coating composition comprising the water-dispersible coating composition of claim 1 and a coloring pigment and/or metallic pigment in practicing the two-coat one-bake method or the two-coat two-bake method.

6. A coated product with a coating film formed by the coating method as defined in claim 5.

* * * * *